(12) United States Patent
Nakano et al.

(10) Patent No.: US 6,338,869 B1
(45) Date of Patent: Jan. 15, 2002

(54) COATING COMPOSITION

(75) Inventors: Tadashi Nakano, Ninomiya-machi; Akira Saito, Fujisawa; Shigeo Inomata, Hiratsuka, all of (JP)

(73) Assignee: Kansai Paint Co., Ltd., Hyogo-Ken (JP)

(*) Notice: Subject to any disclaimer, the term of this patent is extended or adjusted under 35 U.S.C. 154(b) by 35 days.

(21) Appl. No.: 09/594,789

(22) Filed: Jun. 16, 2000

(30) Foreign Application Priority Data

Jun. 18, 1999 (JP) .......................................... 11-172777

(51) Int. Cl.⁷ .............................................. B32B 35/00
(52) U.S. Cl. ...................... 427/140; 427/142; 427/410; 523/402; 523/403; 523/404; 523/423; 523/424; 428/413
(58) Field of Search ................................. 427/140, 142, 427/410; 523/402, 403, 404, 423, 424; 428/413

(56) References Cited

U.S. PATENT DOCUMENTS 6,187,376 B1 * 2/2001 Campbell ................... 427/142

* cited by examiner

*Primary Examiner*—Robert Dawson
*Assistant Examiner*—D. Aylward
(74) *Attorney, Agent, or Firm*—Wenderoth, Lind & Ponack, L.L.P.

(57) ABSTRACT

The present invention provides a coating composition capable of forming a coating film having good performances such as an adhesive property even if coated on a deteriorated coating film surface of a high rust-preventive coating film of a tar epoxy resin coating material and the like without providing pre-treatment, and a coating method thereof. The above coating composition is a coating composition of an organic solvent type or solventless type comprising an epoxy resin having at least one epoxy group in a molecule and an amine base curing agent as resin components, wherein moisture of 1 to 30 parts by weight per 100 parts by weight of the solid matter of the coating composition is contained.

14 Claims, No Drawings

COATING COMPOSITION

The present invention relates to a coating composition capable of forming a coating film having a good performance when coated on a deteriorated coating film surface of a coating film formed from a tar epoxy resin coating material, a tar urethane resin coating material, a modified epoxy resin coating material, a modified urethane resin coating material, an epoxy-polyamine resin coating material or an epoxy urethane resin coating material without subjecting the deteriorated coating film to pre-treatment, and a coating method thereof.

In large size steel structures such as marine vessels and bridges which are exposed to a corrosive environment, high corrosion-protective coating materials such as a tar epoxy resin coating material, a tar urethane resin coating material, a modified epoxy resin coating material, a modified urethane resin coating material, an epoxy-polyamine resin coating material and an epoxy urethane resin coating material are coated on upper structures, decks, holds, ballast tanks, cargo tanks and outside plates of marine vessels; and outside plates, girder outside surfaces and girder inside surfaces of bridges from a viewpoint of corrosion protection.

These large size steel structures have usually as long building and constructing periods as 3 to 24 months, and therefore coating films of a tar epoxy resin coating material, a tar urethane resin coating material, a modified epoxy resin coating material a modified urethane resin coating material, an epoxy-polyamine resin coating material and an epoxy urethane resin coating material are usually exposed in an outdoor for not much longer than 1 to 12 months.

In general the coating films of these resin bases are inferior in a weatherability, and a deterioration of the coating films such as discoloration, glaze reduction and chalking is brought about if they are exposed in an outdoor over a long period of time. This deterioration is notably observed in the coating film of a tar epoxy resin coating material or a tar urethane resin coating material.

If a prescribed coating material is applied directly on coating films which are formed by applying the coating materials of the resin bases described above and which are exposed in an outdoor over a long period of time during building, constructing or using and deteriorated, an adhesive property between this applied coating film and the deteriorated coating films is markedly inferior, and therefore brought about is the defect that the problems of cracking and peeling are caused many times during a building, constructing or using period.

With respect to a countermeasure therefor, when a coating material is applied on the deteriorated coating film described above, a deteriorated layer on the surface of the resin base coating film described above is removed by blast treatment or removing treatment using a power tool, a hand tool or high pressure washing, and then a prescribed coating material is applied. However, a lot of labor and cost is required for removing this deteriorated coating film, and therefore strongly desired to be developed are a coating material capable of forming a coating film having a good corrosion prevention on the above deteriorated coating film without providing such removing step and causing the problems of cracking and peeling on the above deteriorated coating film, and a coating method.

Further, the coating films of the resin bases described above are deteriorated not only by exposure but also by submerging without treating the deteriorated coating film, and if a prescribed coating material is applied on a coating film which is deteriorated by submerging, an adhesive property between the applied coating film and the deteriorated coating films is markedly inferior, so that the problems of cracking and peeling are brought about many times during a building, constructing or using period.

An object of the present invention is to provide a coating composition capable of forming a coating film having good performances such as an adhesive property even if coated on a deteriorated coating film surface of a coating film formed by applying a tar epoxy resin coating material, a tar urethane resin coating material, a modified epoxy resin coating material, a modified urethane resin coating material, an epoxy-polyamine resin coating material or an epoxy urethane resin coating material without subjecting the deteriorated coating film to pre-treatment, and a coating method thereof.

The present inventors paid attentions to the fact that in a deterioration phenomenon of a coating film caused by the outdoor exposure and submerging described above, a part of resin components (an epoxy resin, a curing agent and other jointly used resins) contained in the coating film was deteriorated to form a carboxyl group and considered that if the carboxyl group in this deteriorated coating film would be chemically bonded to a part of components of a coating material applied on the deteriorated coating film, an adhesive property between the coating films might be able to be improved. As a result of carrying out various investigations, it has been found, to be unexpected, that the object described above can be achieved by using a coating composition of an organic solvent type or solventless type epoxy resin-amine curing agent system and adding a prescribed amount of water to the coating composition, and the present invention has come to be completed.

Thus, the present invention provides a coating composition of an organic solvent type or solventless type comprising an epoxy resin having at least one epoxy group in a molecule and an amine base curing agent as resin components, wherein moisture of 1 to 30 parts by weight per 100 parts by weight of the solid matter of the coating composition is contained.

Further, the present invention provides a coating method characterized by applying the preceding coating composition provided by the present invention on a deteriorated coating film surface of a coating film formed by applying a tar epoxy resin coating material, a tar urethane resin coating material, a modified epoxy resin coating material a modified urethane resin coating material, an epoxypolyamine resin coating material or an epoxy urethane resin coating material.

The coating composition of the present invention and the coating method thereof shall be explained below in further details.

First, the coating composition of the present invention shall be explained.

Epoxy Resin

The epoxy resin which is used in the coating composition of the present invention as a resin component is a resin having at least one epoxy group, preferably at least two epoxy groups on an average and more preferably 2 to 5 epoxy groups on an average in a molecule, and it has suitably a number average molecular weight falling in a range of usually about 250 to about 3,000, preferably about 360 to about 1,000 and an epoxy equivalent falling in a range of usually about 80 to about 1,000, preferably about 180 to about 500.

The epoxy resin described above includes, for example, glycidyl ether type epoxy resins, glycidyl ester type epoxy resins, other glycidyl type epoxy resins and alicyclic epoxy resins; modified epoxy resins based on these epoxy resins;

and epoxy group-introduced alkylphenol or alkylphenol novolak type resins prepared by reacting alkylphenol or alkylphenol novolak type resins with epichlorohydrin.

The glycidyl ether type epoxy resins described above include, for example, epoxy resins having a glycidyl ether group which can be obtained by reacting polyhydric alcohols and polyhydric phenols with epihalohydrin or alkylene oxides. Examples of the polyhydric alcohols described above include divalent alcohols such as ethylene glycol, polyethylene glycol, propylene glycol polypropylene glycol, neopentyl glycol, butylene glycol and hexanediol; trivalent alcohols such as glycerin, trimethylolethane and trimethylolpropane; pentaerythritol, diglycerin and sorbitol. Examples of the polyhydric phenols described above include 2,2-bis(4-hydroxyphenyl)propane-[bisphenol A], 2,2-bis(2-hydroxyphenyl)propane, 2-(2-hydroxyphenyl)-2-(4-hydroxyphenyl)propane, halogenated bisphenol A, bis(4-hydroxy-phenyl)methane[bisphenol F], tris(4-hydroxyphenyl)propane, resorcin, tetrahydroxyphenylethane, 1,2,3-tris(2,3-epoxypropoxy)-propane, novolak type polyhydric phenols and cresol type polyhydric phenols.

The glycidyl ester type epoxy resins described above include, for example, diglycidyl phthalate, diglycidyl hexahydrophthalate, diglycidyl tetrahydrophthalate and diglycidyl dimerate.

The other glycidyl type epoxy resins described above include, for example, tetraglycidyl aminodiphenylmethane and triglycidyl isocyanurate.

The alicyclic epoxy resins described above include (3,4-epoxy-6-methylcyclohexyl)methyl-3,4-epoxy-6-methylcyclohexane-carboxylate, (3,4-epoxycyclohexyl)methyl-3,4-epoxycyclohexane-carboxylate, bis(3,4-epoxycyclohexylmethyl)adipate, bis(3,4-epoxy-6-methylcyclohexylmethyl)adipate, Epolead GT300 (trade name, trifunctional alicyclic epoxy resin manufactured by Daicel Chemical Industries, Ltd.), Epolead GT400 (trade name, tetrafunctional alicyclic epoxy resin manufactured by Daicel Chemical Industries, Ltd.) and EHPE (trade name, multifunctional alicyclic epoxy resin manufactured by Daicel Chemical Industries, Ltd.).

The modified epoxy resins described above include epoxy resins modified by reacting a non-modified epoxy resin selected from the glycidyl ether type epoxy resins, the glycidyl ester type epoxy resins, the other glycidyl ether type epoxy resins and the alicyclic epoxy resins each described above with a modifying agent such as alkylphenols, fatty acids, phosphoric acid and acryl resins. The non-modified epoxy resins described above have suitably an epoxy equivalent of about 250 or less, particularly 180 to 200 on an average.

The alkylphenol capable of being used as the modifying agent described above is preferably phenol having an alkyl group having 2 to 18 carbon atoms, and specific examples thereof include p-t-butylphenol, p-octylphenol and nonylphenol. The fatty acids capable of being used as the modifying agent described above are suitably drying oil fatty acids and semi-drying oil fatty acids, and specific examples thereof include linseed oil fatty acid, safflower oil fatty acid, soybean oil fatty acid, sesame oil fatty acid, eno oil fatty acid, hemp-seed oil fatty acid, grapestone oil fatty acid, tung oil fatty acid, corn oil fatty acid, sunflower oil fatty acid, cotton seed oil fatty acid, walnut oil fatty acid, gum seed oil fatty acid, oiticica oil fatty acid, fish oil fatty acid, high diene fatty acid, tall oil fatty acid and dehydrated castor oil fatty acid. The alkylphenols and the fatty acids described above which are modifying agents can be used alone or in a mixture of two or more kinds thereof.

Among them, aromatic epoxy resins having glycidyl ether groups are suited for the epoxy resin used in the coating composition of the present invention.

Amine Base Curing Agent

The amine base curing agent used as the resin component in the composition of the present invention works as a curing agent for the epoxy resin described above and can be a compound having at least two amino groups or groups capable of being converted into amino groups when coming in contact with water.

The amine base curing agent includes, for example, aliphatic polyamines such as ethylenediamine, propylenediamine, butylenediamine, hexamethylenediamine, diethylenetriamine, triethylenetetramine, tetraethylenepentamine, pentaethylenehexamine and diethylaminopropylamine; alicyclic polyamines such as 1,3-bisaminomethylcyclohexane and isophoronediamine; aromatic polyamines such as xylilenediamine, metaxylenediamine, diaminodiphenylmethane and phenylenediamine; and modified compounds of these polyamines, for example, polyamides, polyamideamines, amine adducts with epoxy compounds, Mannich compounds, Michaelis adducts, ketimines and aldimines. Glycidyl ether type epoxy resins having a number average molecular weight of 300 to 1000 can suitably be used as the epoxy compounds constituting the adducts described above. Among them, suited in the present invention are polyamides of polyamines selected from diethylenetriamine, triethylenetetramine, tetraethylenepentamine and metaxylenediamine; amine adducts of these polyamines with epoxy compounds; and the Mannich compounds of metaxylenediamine.

A blending proportion of the epoxy resin described above to the amine base curing agent described above in the composition described above shall not specifically be restricted. Usually, they are suitably used in such a proportion that active hydrogens bonded to amino groups (including generated amino groups) contained in the amine base curing agent fall in total in a range of 0.5 to 5 equivalents, preferably 0.6 to 3 equivalents per one equivalent of the epoxy groups contained in the epoxy resin.

Coating Composition

The coating composition of the present invention is based on a coating material of an organic solvent type or solventless type and contains water in a range of 1 to 30 parts by weight, preferably 2 to 15 parts by weight and more preferably 3 to 10 parts by weight per 100 parts by weight of the solid matter of the coating composition. If the moisture content is less than 1 part by weight, the adhesive property thereof obtained when applied on the deteriorated coating film described above becomes unsatisfactory. On the other hand, if it exceeds 30 parts by weight, the coating material tends to be reduced in a stability, and the resulting coating film tends to be reduced in a moisture resistance and a salt water resistance.

The coating composition of the present invention may contain in advance the preceding prescribed amount of water or may be blended with water immediately before coating so that the amount of water in the coating composition becomes the prescribed amount described above.

The coating composition of the present invention comprises the epoxy resin described above, the amine base curing agent described above and water as the essential components, and in the case of the organic solvent type coating material, it further comprises an organic solvent in addition to these essential components.

Any organic solvents can be used without specific restrictions as long as they can dissolve or disperse the above epoxy resin and amine base curing agent. Specific examples of the organic solvent include, for example, hydrocarbon base solvents such as xylene, toluene, VM & P naphtha, mineral spirit, solvent kerosene, aromatic naphtha, solvent naphtha, Solvesso 100, Solvesso 150 and Solvesso 200 ("Solvesso" is the registered trade name of Esso Oil Co., Ltd.), Swasol 310, Swasol 1000 and Swasol 1500 ("Swasol" is the registered trade name of Cosmo Oil Co., Ltd.), n-butane, n-hexane, n-heptane, n-octane, isononane, n-decane, n-dodecane, cyclopentane, cyclohexane and cyclobutane; ketones such as acetone, methyl ethyl ketone, methyl isobutyl ketone, cylohexanone and isophorone; ester base solvents such as ethyl acetate, butyl acetate, ethylene glycol monomethyl ether acetate, ethylene glycol monoethyl ether acetate and diethyl succinate; ether alcohol base solvents such as ethylene glycol monoethyl ether, ethylene glycol monobutyl ether and diethylene glycol monoethyl ether; and alcohol base solvents such as ethanol, isopropanol n-butanol and isobutanol. These organic solvents can be used alone or in a mixture of two or more kinds thereof.

The coating composition of the present invention can contain, in addition to the essential components and the organic solvent (in the case of the organic solvent type) described above, if necessary, other resins for a coating material; metal powder such as zinc powder and aluminum powder; pigments such as a color pigment, an extender pigment and a corrosion preventive pigment; and an additive such as a defoaming agent, a leveling agent, a thickener, a plasticizer, a filler and a dispersant.

The other resins for a coating material described above include resins which are usually blended with a coating material, for example, a modified epoxy resin having no epoxy groups, a xylene resin, a toluene resin, a ketone resin, a coumarone resin, a petroleum resin, a phenol resin and a dicyclopentadiene resin; a carbonization residue such as tar, pitch and coal digested pitch; and a petroleum distillation residue such as asphalt. They are used for modifying the coating film. These other resins for a coating material can be blended alone or in combination of two or more kinds thereof.

The modified epoxy resin having no epoxy groups described above is a resin which is derived from an epoxy resin and has no epoxy groups taking part in curing and includes, for example, a urethane-modified epoxy resin, an amine-modified epoxy resin and a dimer-modified epoxy resin. Among them, the urethane-modified epoxy resin includes, for example, resins prepared by further reacting a poly- or mono-isocyanate compound with amine-added epoxy resins obtained by reacting an epoxy resin with amines.

Compounds which are solid at a room temperature and have a melting point falling in a range of 60° C. or higher, preferably 70 to 140° C. can suitably be used as the xylene resin, the toluene resin, the ketone resin, the coumarone resin, the petroleum resin, the phenol resin and the dicyclopentadiene resin; the carbonization residue such as tar, pitch and coal digested pitch; and the petroleum distillation residue such as asphalt each described above.

The coating composition of the present invention can be applied on material surfaces of metals (iron, aluminum, zinc and the like), wood, plastics, stones, slates, concrete and mortar or old coating film surfaces applied on these materials, and other substrate surfaces. When the coating composition of the present invention is applied on the deteriorated old coating film surface out of them, the coating composition of the present invention can display an effect that an adhesive property with the old coating film becomes good. Conventional methods such as, for example, brush coating, roller coating, spray coating, electrostatic coating and various coater coatings can be used as the coating method therefor.

A coating amount of the coating composition of the present invention shall not specifically be restricted and falls suitably in a range of about 5 to about 100 $\mu$m, preferably about 10 to about 50 $\mu$m in terms of a cured film thickness in the case of a clear coating material and about 10 to about 500 $\mu$m, preferably about 40 to about 250 $\mu$m in terms of a cured film thickness in the case of a coating material containing a pigment.

Further, a top coating material can be applied, if necessary, on a coating film formed by applying and drying the coating composition of the present invention. This top coating material shall not specifically be restricted, and conventionally known top coating materials can be used. Capable of being used are, for example, coating materials of an alkyd resin base, a chlorinated rubber base, an epoxy resin base, a silicon alkyd resin base, a urethane resin base, a silicon acryl resin base and a fluororesin base.

Next, the coating method of the present invention shall be explained.

The coating method of the present invention is characterized by applying the coating composition of the present invention described above on a deteriorated coating film surface of a coating film formed by applying a tar epoxy resin coating material, a tar urethane resin coating material, a modified epoxy resin coating material, a modified urethane resin coating material, an epoxy-polyamine resin coating material or an epoxy urethane resin coating material.

All of the tar epoxy resin coating material, the tar urethane resin coating material, the modified epoxy resin coating material, the modified urethane resin coating material, the epoxy-polyamine resin coating material and the epoxy urethane resin coating material each described above can be coating materials which are already known in the coating field of large size steel structures such as marine vessels, bridges and steel towers. The tar epoxy resin coating material includes, for example, a coating material comprising an epoxy resin and tar as resin components. The tar urethane resin coating material includes, for example, a coating material comprising a urethane resin and tar as resin components. The modified epoxy resin coating material includes, for example, a coating material comprising an epoxy resin and a modified resin (for example, a xylene resin, a toluene resin, a ketone resin, a coumarone resin, a petroleum resin, a phenol resin and a dicyclopentadiene resin; a carbonization residue such as tar, pitch and coal digested pitch; and a petroleum distillation residue such as asphalt) as resin components. The modified urethane resin coating material includes, for example, a coating material comprising a urethane resin and the modified resin described above as resin components. The epoxy-polyamine resin coating material includes, for example, a coating material comprising an epoxy resin and a polyamine curing agent as resin components. The epoxy urethane resin coating material includes, for example, a coating material comprising a resin obtained by reacting an epoxy resin with a poly- or mono-isocyanate compound as a resin component.

The surface of a coating film formed by applying the tar epoxy resin coating material the tar urethane resin coating material the modified epoxy resin coating material, the modified urethane resin coating material, the epoxy-polyamine resin coating material or the epoxy urethane resin coating material is liable to be deteriorated by exposing and submerging, and in a coating film formed from the tar epoxy resin coating material, the tar urethane resin coating material, the modified epoxy resin coating material or the modified urethane resin coating material, deterioration such as discoloration, glaze reduction and chalking is usually advanced to a considerable extent even after exposure of not much longer than one month. In a coating film formed from the epoxy-polyamine resin coating material or the epoxy urethane resin coating material, deterioration is usually advanced to a considerable extent after exposure of not much longer than one year. Carboxyl groups are formed on these coating film surfaces by deterioration. If the coating composition of the present invention is applied on these deteriorated coating films, a coating film which has a good adhesive property and does not cause cracking and peeling during a building, constructing or using period and which has a good coating film performance can be formed without subjecting the deteriorated coating film to surface treatment (blast treatment or such various removing treatments as described above).

A reason why the coating composition of the present invention shows an excellent adhesive property to the deteriorated coating film described above is not accurately known, but the present inventors estimate that it is due to the fact that according to, for example, the following reaction equation:

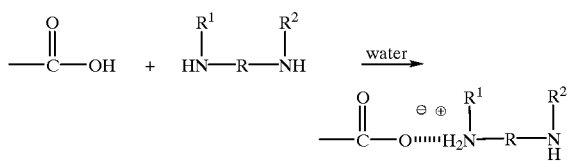

[wherein $R^1$ and $R^2$ are the same or different and each represent a hydrogen atom or a hydrocarbon group such as an alkyl group or an allyl group], moisture contained in the coating composition of the present invention acts as a catalyst for a salt-forming reaction of a carboxyl group in the deteriorated coating film with an amino group of the amine base curing agent contained in the coating composition to accelerate the salt-forming reaction described above and that this salt formation contributes to a rise in the adhesive property.

The coating composition of the present invention can be applied on the deteriorated coating film surface of the coating material described above by means of a conventional method such as, for example, brush coating, roller coating, spray coating, electrostatic coating and various coater coatings.

A coating amount of the coating composition of the present invention shall not strictly be restricted and can be changed according to the kind and the condition of a surface to be coated. In general, it falls suitably in a range of about 5 to about 100 μm, preferably about 10 to about 50 μm in terms of a cured film thickness in the case of a clear coating material and about 10 to about 500 μm, preferably about 40 to about 250 μm in terms of a cured film thickness in the case of a coating material containing a pigment.

A coating film formed using the coating composition of the present invention is cured usually by leaving standing at a room temperature but can be cured as well, if necessary, by heating to a temperature of up to about 80° C. according to the kind of the amine base curing agent used.

The present invention shall more specifically be explained below with reference to examples. "Parts" and "%" are based on weight unless otherwise described.

EXAMPLE 1

Blended were 25 parts of Epikote 828 (bisphenol A type epoxy resin, epoxy equivalent: about 190, manufactured by Yuka Shell Epoxy Co., Ltd.), 5 parts of titanium white, 40 parts of talc, 5 parts of xylene, 2 parts of methyl isobutyl ketone and 3 parts of propylene glycol monomethyl ether to disperse the pigments. Blended with 80 parts of this pigment dispersion was 5 parts of deionized water, and the dispersion was homogeneously mixed to obtain a coating material base.

Immediately before coating, 15 parts of Tohmide 225X (polyamine resin solution having a solid content of 80%, active hydrogen equivalent of the resin solid matter: about 115, manufactured by Fuji Kasei Kogyo Co., Ltd.) was blended with 85 parts of the coating material base described above, and the dispersion was homogeneously mixed, whereby a coating composition was prepared and used for coating.

EXAMPLES 2 to 7 and

Comparative Examples 1 to 6

Pigment dispersions were produced in the same manner as in Example 1, except that epoxy resins, pigments and organic solvents shown in the following Table 1 were mixed, and then jointly used resins and deionized water shown in the following Table 1 were blended with the whole amounts of the resulting pigment dispersions, and the dispersions were homogeneously mixed to obtain coating material bases. Immediately before coating, amine base curing agents shown in the following Table 1 were blended with the whole amounts of the coating material bases, and the dispersions were homogeneously mixed, whereby the respective coating compositions were prepared and used for coating.

TABLE 1

|  |  |  | Example | | | | | | | Comparative Example | | | | | |
|---|---|---|---|---|---|---|---|---|---|---|---|---|---|---|---|
|  |  |  | 1 | 2 | 3 | 4 | 5 | 6 | 7 | 1 | 2 | 3 | 4 | 5 | 6 |
| Epoxy | Epikote 828 |  | 25 |  | 25 | 25 |  |  | 25 | 25 |  | 25 | 25 |  | 25 |
| resin | Epikote 1001 | (*1) |  | 25 |  |  |  | 25 |  |  | 25 |  |  | 30 |  |
|  | Haripole EP450 | (*2) |  |  |  |  | 25 |  |  |  |  |  |  |  |  |
| Added | Syntaron 750 | (*3) |  | 8 |  |  |  | 10 | 10 |  | 8 |  |  |  |  |
| resin | Hisol SAS296 | (*4) |  |  |  |  |  | 5 | 5 |  |  |  |  | 5 |  |
|  | Nikanol Y-50 | (*5) |  |  |  |  | 15 |  |  |  |  |  |  | 5 |  |
|  | PX Tar | (*6) |  |  |  | 4 |  |  |  |  |  |  |  |  |  |
| Pigment | Titanium white |  | 5 | 10 | 5 | 5 | 8 | 10 | 10 | 5 | 10 | 5 | 5 | 10 | 10 |
|  | Talc |  | 40 | 15 | 25 | 40 | 15 | 20 | 25 | 40 | 15 | 25 | 40 | 25 | 15 |
|  | Clay |  |  | 15 | 7 |  | 20 | 5 |  |  | 15 | 20 |  | 5 | 10 |
| Organic | Xylene |  | 5 | 7 |  | 4 | 3 | 4 |  | 5 | 7 | 8 | 4 | 7 | 2 |

TABLE 1-continued

|  |  | Example | | | | | | | Comparative Example | | | | | |
|---|---|---|---|---|---|---|---|---|---|---|---|---|---|---|
|  |  | 1 | 2 | 3 | 4 | 5 | 6 | 7 | 1 | 2 | 3 | 4 | 5 | 6 |
| solvent | Methyl isobutyl ketone | 2 | 3 |  |  | 5 |  |  | 4 | 3 |  | 4 | 3 |  |
|  | Isobutanol |  |  |  | 2 | 2 |  |  |  |  |  | 2 | 1.7 |  |
|  | Benzyl alcohol |  |  | 2 | 3 | 2 |  | 4 |  |  | 2 | 3 | 2 |  |
|  | Propylene glycol monomethyl ether | 3 | 2 | 2 |  | 2 | 2 |  | 6 | 2 | 2 | 6 | 2 | 2 |
| Deionized water |  | 5 | 1 | 21 | 10 | 3 | 5 | 15 |  |  |  |  | 0.3 | 28 |
| Curing agent | Tohmide 225X | 15 | 12 |  |  |  | 10 |  | 15 | 12 |  |  |  |  |
|  | Adeka Hardener EH4300 (*7) |  |  |  | 8 |  |  |  |  |  |  | 8 | 3 | 8 |
|  | Daito Curar HDS325 (*8) |  |  | 12 |  |  |  | 10 |  |  | 12 |  | 3 |  |
|  | Versamine K-13 (*9) |  |  |  |  | 2 |  |  |  |  |  |  |  |  |
| Total amount of coating composition |  | 100 | 100 | 100 | 100 | 100 | 100 | 100 | 100 | 100 | 100 | 100 | 100 | 100 |
| Coating solid content (%) |  | 82.0 | 75.1 | 74.0 | 81.2 | 75.0 | 75.5 | 85.0 | 82.0 | 75.1 | 87.0 | 77.2 | 73.7 | 87.2 |
| Moisture amount based on coating solid content (%) |  | 6.1 | 1.3 | 28.4 | 12.3 | 4.0 | 6.6 | 17.6 | 0 | 0 | 0 | 0 | 0.4 | 41.6 |

(*1) Epikote 1001: bisphenol A type epoxy resin having a solid content of 70%, epoxy equivalent of resin solid matter: about 470, manufactured by Yuka Shell Epoxy Co., Ltd.
(*2) Haripole EP450: epoxy resin solution having a solid content of 60%, epoxy equivalent of resin solid matter: about 700, manufactured by Harima Chemicals, Inc.
(*3) Syntaron 750: petroleum resin, manufactured by Tokyo Jushi Kogyo Co., Ltd.
(*4) Hisol SAS296: aromatic hydrocarbon compound, manufactured by Nippon Petrochemicals Co., Ltd.
(*5) Nikanol Y-50: xylene resin, manufactured by Mitsubishi Gas Chemical Company, Inc.
(*6) PX Tar: carbonization residue, manufactured by Osaka Kasei Company Ltd.
(*7) Adeka Hardener EH4300: amine adduct, resin solid content: 90%, active hydrogen equivalent: about 90, manufactured by Asahi Denka Kogyo Co., Ltd.
(*8) Daito Curar HD325: Mannich compound, resin solid content: 100%, active hydrogen equivalent: about 95, manufactured by Daito Sangyo Co., Ltd.
(*9) Versamine K-13: ketimine; resin solid content: 100%, active hydrogen equivalent: about 91 (assuming that ketone of a blocking agent is desorbed), manufactured by Cognis Japan Ltd.

The respective coating compositions obtained in Examples 1 to 7 and Comparative Examples 1 to 6 were coated based on the following preparing method of a coated plate to prepare various coated plates.

Preparing Method of Coated Plate

Preparation of Coated Plate (1)

The coating compositions prepared in the respective examples described above were applied on a polished mild steel plate so that the dried film thickness became 100 μm and dried in a room of a temperature of 20° C. and a humidity of 65% RH for 7 days to thereby obtain the respective coated plates (1).

Preparation of Coated Plate (2) A

A tar epoxy resin coating material ("Eposeal 6000PS", manufactured by Kansai Paint Co., Ltd.) was applied on a polished mild steel plate so that the dried film thickness became 100 μm and dried in a room of a temperature of 20° C. and a humidity of 65% RH for 7 days to prepare plural coated plates, and treated plates subjected to three kinds of different treatments were obtained. The first treated plates were stored in a dark place in a room of a temperature of 20° C. and a humidity of 65% RH for 30 days. The second treated plates were exposed in an outdoor on the seashore for 30 days. The third treated plates were immersed in a brine of 40° C. for one year. The coating compositions obtained in Examples 1 to 7 and Comparative Examples 1 to 6 were applied on these three kinds of the treated plates so that the dried film thickness became 100 μm and dried in a room of a temperature of 20° C. and a humidity of 65% RH for 7 days to thereby obtain the respective coated plates (2) A-a, (2) A-b and (2) A-c.

Preparation of Coated Plate (2) B

The same procedure as in the preparation of the coated plate (2) A described above was repeated, except that a tar urethane resin coating material ("Eposeal 6000PW", manufactured by Kansai Paint Co., Ltd.) was applied on polished mild steel plates in place of the tar epoxy resin coating material to thereby obtain the respective coated plates (2) B-a, (2) B-b and (2) B-c.

Preparation of Coated Plate (2) C

The same procedure as in the preparation of the coated plate (2) A described above was repeated, except that a modified epoxy resin coating material ("Epomarine EX21", manufactured by Kansai Paint Co., Ltd.) was applied on polished mild steel plates in place of the tar epoxy resin coating material to thereby obtain the respective coated plates (2) C-a, (2) C-b and (2) C-c.

Preparation of Coated Plate (2) D

The same procedure as in the preparation of the coated plate (2) A described above was repeated, except that a modified urethane resin coating material ("Epomarine JW winter type", manufactured by Kansai Paint Co., Ltd.) was applied on polished mild steel plates in place of the tar epoxy resin coating material to thereby obtain the respective coated plates (2) D-a, (2) D-b and (2) D-c.

Preparation of Coated Plate (2) E

The same procedure as in the preparation of the coated plate (2) A described above was repeated, except that an epoxy-polyamine resin coating material ("Epomarine EX500", manufactured by Kansai Paint Co., Ltd.) was applied on polished mild steel plates in place of the tar epoxy resin coating material to thereby obtain the respective coated plates (2) E-a, (2) E-b and (2) E-c.

Preparation of Coated Plate (2) F

The same procedure as in the preparation of the coated plate (2) A described above was repeated, except that an epoxy urethane resin coating material was applied on polished mild steel plates in place of the tar epoxy resin coating material to thereby obtain the respective coated plates (2) F-a, (2) F-b and (2) F-c.

The coating material bases of the respective coating compositions obtained in Examples 1 to 7 and Comparative Examples 1 to 6 described above and the various coated plates obtained by the preparing methods of the coated plates described above were subjected to various tests according to the following test methods. The test results thereof are shown in Table 2 shown later.

Test Methods

Coating Material Storage Stability

Sampled into a round can of one liter was 800 g of the coating material base of the coating composition, and the can was sealed. It was left standing at 40° C. for 30 days, and then the state of the coating composition after left standing was observed. The state was evaluated according to the following criteria:

⊚: good state without having separation of water and vanish

○: state that separation of water and vanish is observed a little

Δ: state that separation of water and vanish is notably observed

X: state that viscosity markedly increases or gelation is observed

Moisture Resistance

The coated plates (1) were tested in a blister box of 50° C. and a relative humidity of 95% RH or more for 30 days, and then a degree of blister on the coating films was evaluated:

Salt Water Resistance

⊚: no blisters are observed

The coated plates (1) were immersed in an artificial salt water of 40° C. for 30 days, and then a degree of blister and rust produced on the coating films was evaluated:

⊚: both blister and rust are not observed

○: blister or rust is observed a little

Δ: blister or rust is considerably observed

X: blister or rust is notably observed

Adhesive Property

Each longitudinal and lateral 6 lines of crossing scratches which reached the substrates were provided on the coating film surfaces of the coated plates (1), the coated plates (2) A, the coated plates (2) B, the coated plates (2) C, the coated plates (2) D, the coated plates (2) E and the coated plates (2) F by means of a knife to form grids having 25 squares of 5 mm square. Subsequently, a cellophane adhesive tape was tightly adhered on these cross-cut parts and then peeled off in a moment to evaluate the number of the cross-cuts which are not peeled off and remain on the coated plates based on the following criteria:

⊚:25 cross-cuts remain without peeling off at all

○:20 to 24 cross-cuts remain

X:10 to 19 cross-cuts remain

X:0 to 9 cross-cuts remain

TABLE 2

| Test Results | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Coating material storage stability | ⊚ | ⊚ | ○ | ⊚ | ⊚ | ⊚ | ⊚ | ⊚ | ⊚ | ⊚ | ⊚ | ⊚ | Δ |
| Moisture resistance | ⊚ | ⊚ | ○ | ⊚ | ⊚ | ⊚ | ○ | ○ | ○ | ○ | ○ | ⊚ | Δ |
| Salt water resistance | ⊚ | ⊚ | ○ | ⊚ | ⊚ | ⊚ | ○ | ○ | ○ | ○ | ○ | ○ | Δ |
| Adhesive property | | | | | | | | | | | | | |
| Coated plate 2 (A) | | | | | | | | | | | | | |
| a indoor storage | ⊚ | ⊚ | ⊚ | ⊚ | ⊚ | ⊚ | ⊚ | ○ | ○ | ○ | ○ | ○ | ○ |
| b exposed on seashore | ⊚ | ○ | ⊚ | ⊚ | ⊚ | ⊚ | ⊚ | x | x | x | x | Δ | ○ |
| c immersed in salt water | ⊚ | ○ | ⊚ | ⊚ | ⊚ | ⊚ | ⊚ | x | x | x | x | Δ | ○ |
| Coated plate 2 (B) | | | | | | | | | | | | | |
| a indoor storage | ⊚ | ⊚ | ⊚ | ⊚ | ⊚ | ⊚ | ⊚ | ○ | ○ | ○ | ○ | ○ | ○ |
| b exposed on seashore | ⊚ | ○ | ⊚ | ⊚ | ⊚ | ⊚ | ⊚ | x | x | x | x | Δ | ○ |
| c immersed in salt water | ⊚ | ○ | ⊚ | ⊚ | ⊚ | ⊚ | ⊚ | x | x | x | x | Δ | ○ |
| Coated plate 2 (C) | | | | | | | | | | | | | |
| a indoor storage | ⊚ | ⊚ | ⊚ | ⊚ | ⊚ | ⊚ | ⊚ | ○ | ○ | ○ | ○ | ○ | ○ |
| b exposed on seashore | ⊚ | ○ | ⊚ | ⊚ | ⊚ | ⊚ | ⊚ | x | x | x | x | Δ | ○ |
| c immersed in salt water | ⊚ | ○ | ⊚ | ⊚ | ⊚ | ⊚ | ⊚ | x | x | x | x | Δ | ○ |
| Coated plate 2 (D) | | | | | | | | | | | | | |
| a indoor storage | ⊚ | ⊚ | ⊚ | ⊚ | ⊚ | ⊚ | ⊚ | ○ | ○ | ○ | ○ | ○ | ○ |
| b exposed on seashore | ⊚ | ○ | ⊚ | ⊚ | ⊚ | ⊚ | ⊚ | x | x | x | x | Δ | ○ |
| c immersed in salt water | ⊚ | ○ | ⊚ | ⊚ | ⊚ | ⊚ | ⊚ | x | x | x | x | Δ | ○ |
| Coated plate 2 (E) | | | | | | | | | | | | | |
| a indoor storage | ⊚ | ⊚ | ⊚ | ⊚ | ⊚ | ⊚ | ⊚ | ⊚ | ⊚ | ⊚ | ⊚ | ⊚ | ⊚ |
| b exposed on seashore | ⊚ | ⊚ | ⊚ | ⊚ | ⊚ | ⊚ | ⊚ | ○ | ○ | Δ | ○ | ○ | Δ |
| c immersed in salt water | ⊚ | ⊚ | ⊚ | ⊚ | ⊚ | ⊚ | ⊚ | ○ | ○ | ○ | ○ | ○ | ○ |
| Coated plate 2 (F) | | | | | | | | | | | | | |
| a indoor storage | ⊚ | ⊚ | ⊚ | ⊚ | ⊚ | ⊚ | ⊚ | ⊚ | ⊚ | ⊚ | ⊚ | ⊚ | ⊚ |
| b exposed on seashore | ⊚ | ⊚ | ⊚ | ⊚ | ⊚ | ⊚ | ⊚ | ○ | ○ | Δ | ○ | ○ | Δ |
| c immersed in salt water | ⊚ | ⊚ | ⊚ | ⊚ | ⊚ | ⊚ | ⊚ | ○ | ○ | ○ | ○ | ○ | ○ |

⊚: no blisters are observed

○: blisters are observed a little

Δ: blisters are considerably observed

X: blisters are notably observed

As described above, the coating composition of the present invention can form a coating film causing no deterioration in an adhesive property which has so far been a problem and having good performances even if coated on a deteriorated coating film surface of a coating film formed by applying a tar epoxy resin coating material, a tar urethane resin coating material, a modified epoxy resin coating material, a modified urethane resin coating material, an epoxy-polyamine resin coating material or an epoxy urethane resin coating material without subjecting the deteriorated coating film to pre-treatment.

Further, use of the coating composition of the present invention can omit pre-treatment of a deteriorated coating film, so that a lot of labor and expense which are required for removing a deteriorated layer on the deteriorated coating film can be saved.

What is claimed is:

1. A coating composition of an organic solvent type or solventless type comprising an epoxy resin having at least one epoxy group in a molecule and an amine base curing agent as resin components, wherein moisture of 1 to 30 parts by weight per 100 parts by weight of the solid matter of the coating composition is contained.

2. The coating composition as described in claim 1, wherein the epoxy resin has a number average molecular weight falling in a range of 250 to 3,000 and an epoxy equivalent falling in a range of 80 to 1,000.

3. The coating composition as described in claim 1, wherein the epoxy resin has a number average molecular weight falling in a range of 360 to 1,000 and an epoxy equivalent falling in a range of 180 to 500.

4. The coating composition as described in claim 1, wherein the epoxy resin is selected from the group consisting of glycidyl ether type epoxy resins, glycidyl ester type epoxy resins, other glycidyl type epoxy resins and alicyclic epoxy resins; modified epoxy resins based on these epoxy resins; and epoxy group-introduced alkylphenol or alkylphenol novolak type resins prepared by reacting alkylphenol or alkylphenol novolak type resins with epichlorohydrin.

5. The coating composition as described in claim 1, wherein the epoxy resin is an aromatic epoxy resin having a glycidyl ether group.

6. The coating composition as described in claim 1, wherein the amine base curing agent is selected from the group consisting of aliphatic polyamines, alicyclic polyamines, aromatic polyamines, and polyamides, polyamideamines, amine adducts with epoxy compounds, Mannich compounds, Michaelis adducts, ketimines and aldimines of these polyamines.

7. The coating composition as described in claim 1, wherein the amine base curing agent is selected from the group consisting of ethylenediamine, propylenediamine, butylenediamine, hexamethylenepentamine, diethylenetriamine, triethylenetetramine, tetraethylenepentamine, pentaethylenehexamine, diethylaminopropylamine, 1,3-bisaminomethylcyclohexane, isophoronediamine, xylilenediamine, metaxylenediamine, diaminodiphenylmethane, phenylenediamine, polyamides, polyamideamines, amine adducts with epoxy compounds, Mannich compounds, Michaelis adducts, ketimines and aldimines of these polyamines.

8. The coating composition as described in claim 1, wherein the amine base curing agent is polyamide of polyamine selected from diethylenetriamine, triethylenetetramine, tetraethylenepentamine and metaxylenediamine; an amine adduct of these polyamines with an epoxy compound; or a Mannich compound of metaxylenediamine.

9. The coating composition as described in claim 1, wherein the amine base curing agent is contained in such a proportion that active hydrogens bonded to amino groups contained in the amine base curing agent fall in total in a range of 0.5 to 5 equivalents per one equivalent of the epoxy groups contained in the epoxy resin.

10. The coating composition as described in claim 1, wherein the moisture is contained in a range of 2 to 15 parts by weight per 100 parts by weight of the solid matter of the coating composition.

11. The coating composition as described in claim 1, wherein the moisture is contained in a range of 3 to 10 parts by weight per 100 parts by weight of the solid matter of the coating composition.

12. The coating composition as described in claim 1, further comprising as a resin component at least one resin selected from a modified epoxy resin having no epoxy groups, a xylene resin, a toluene resin, a ketone resin, a coumarone resin, a petroleum resin, a phenol resin, a dicyclopentadiene resin, tar, pitch, coal digested pitch and asphalt.

13. A coating method comprising applying the coating composition as described in claim 1 on a deteriorated coating film surface of a coating film of a tar epoxy resin coating material, a tar urethane resin coating material, a modified epoxy resin coating material, a modified urethane resin coating material, an epoxy-polyamine resin coating material or an epoxy urethane resin coating material.

14. An article coated with the coating composition as described in claim 1.

* * * * *